(12) United States Patent
Warner et al.

(10) Patent No.: US 7,853,573 B2
(45) Date of Patent: Dec. 14, 2010

(54) EFFICIENT REPLICATION OF XML DATA IN A RELATIONAL DATABASE MANAGEMENT SYSTEM

(75) Inventors: James W. Warner, Lake Oswego, OR (US); Zhen Hua Liu, San Mateo, CA (US); Sundeep Abraham, Belmont, CA (US); Muralidhar Krishnaprasad, Fremont, CA (US); Geeta Arora, Union City, CA (US); Ravi Murthy, Fremont, CA (US); Sivasankaran Chandrasekar, Palo Alto, CA (US); Lik Wong, Union City, CA (US); Nimar S. Arora, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 65 days.

(21) Appl. No.: 11/416,835

(22) Filed: May 3, 2006

(65) Prior Publication Data

US 2007/0260650 A1 Nov. 8, 2007

(51) Int. Cl.
*G06F 7/00* (2006.01)
*G06F 17/00* (2006.01)
*G06F 17/30* (2006.01)
(52) U.S. Cl. .................. 707/693; 707/802; 715/239
(58) Field of Classification Search ............... None
See application file for complete search history.

(56) References Cited

U.S. PATENT DOCUMENTS

| 6,282,548 | B1 | 8/2001 | Burner et al. |
| 6,502,098 | B2 | 12/2002 | Lau |
| 6,850,948 | B1 * | 2/2005 | Krasinski .................. 707/101 |
| 6,889,231 | B1 | 5/2005 | Souder et al. |
| 6,999,956 | B2 | 2/2006 | Mullins |
| 7,031,956 | B1 | 4/2006 | Lee et al. |
| 7,233,956 | B2 | 6/2007 | Balducci et al. |
| 7,370,051 | B2 | 5/2008 | Don et al. |
| 7,386,568 | B2 | 6/2008 | Warner et al. |
| 7,555,493 | B2 | 6/2009 | Khayter et al. |
| 7,571,160 | B2 * | 8/2009 | Riccardi et al. ............... 707/4 |
| 7,577,647 | B2 * | 8/2009 | Graefe et al. ................ 707/4 |
| 2001/0036357 | A1 | 11/2001 | Tauchi et al. |
| 2002/0073019 | A1 | 6/2002 | Deaton |
| 2002/0116457 | A1 | 8/2002 | Eshleman et al. |
| 2003/0229529 | A1 | 12/2003 | Mui et al. |
| 2004/0010521 | A1 | 1/2004 | Li et al. |

(Continued)

OTHER PUBLICATIONS

Oracle, "Understanding Streams Replication," *Oracle Streams—Replication Administrators Guide 10g Release 1 (10.1)*, Chapter 1, Dec. 2003, 34 pages.

(Continued)

*Primary Examiner*—Uyen T. Le
(74) *Attorney, Agent, or Firm*—Hickman Palermo Truong & Becker LLP

(57) ABSTRACT

Efficiently replicating XML data among databases includes techniques for (a) replicating XML data involved with an insert operation; (b) replicating XML data involved with an update operation; (c) leveraging existing relational replication techniques for XML data stored in shredded form using object-relational constructs; and (d) replicating XQuery Data Model sequences. Each technique reduces the amount of information that would otherwise need to be transmitted over a network for XML data replication purposes.

28 Claims, 5 Drawing Sheets

U.S. PATENT DOCUMENTS

| | | | |
|---|---|---|---|
| 2004/0054686 A1 | 3/2004 | Hembry | |
| 2004/0088415 A1* | 5/2004 | Chandrasekar et al. | 709/226 |
| 2004/0117435 A1 | 6/2004 | Rossmanith et al. | |
| 2004/0148278 A1 | 7/2004 | Milo et al. | |
| 2004/0220946 A1* | 11/2004 | Krishnaprasad et al. | 707/100 |
| 2004/0267760 A1 | 12/2004 | Brundage et al. | |
| 2005/0050059 A1 | 3/2005 | Van Der Linden et al. | |
| 2005/0086639 A1* | 4/2005 | Min et al. | 717/114 |
| 2005/0108209 A1* | 5/2005 | Beyer et al. | 707/3 |
| 2005/0128995 A1* | 6/2005 | Ott et al. | 370/349 |
| 2005/0138048 A1* | 6/2005 | Jin et al. | 707/100 |
| 2005/0138545 A1* | 6/2005 | Saint-Hilaire et al. | 715/513 |
| 2005/0268341 A1* | 12/2005 | Ross | 726/26 |
| 2005/0289125 A1 | 12/2005 | Liu et al. | |
| 2006/0036935 A1* | 2/2006 | Warner et al. | 715/500 |
| 2006/0074775 A1 | 4/2006 | Roman et al. | |
| 2006/0075006 A1* | 4/2006 | Yu et al. | 707/205 |
| 2006/0095202 A1 | 5/2006 | Atarashi et al. | |
| 2006/0143040 A1 | 6/2006 | Scheier et al. | |
| 2006/0167927 A1* | 7/2006 | Edelstein et al. | 707/102 |
| 2006/0173865 A1* | 8/2006 | Fong | 707/100 |
| 2006/0212467 A1 | 9/2006 | Murthy et al. | |
| 2006/0224702 A1 | 10/2006 | Schmidt et al. | |
| 2007/0005622 A1* | 1/2007 | Fernandes et al. | 707/101 |
| 2007/0044012 A1* | 2/2007 | Suver et al. | 715/513 |
| 2007/0061786 A1 | 3/2007 | Zhou et al. | |
| 2007/0273564 A1* | 11/2007 | Morel | 341/87 |
| 2008/0109447 A1 | 5/2008 | Mathur | |
| 2008/0140705 A1 | 6/2008 | Luo | |
| 2008/0189617 A1 | 8/2008 | Covell et al. | |

OTHER PUBLICATIONS

Oracle, "Instantiation and Streams Replication," *Oracle Streams—Replication Administrators Guide 10g Release 1 (10.1)*, Chapter 2, Dec. 2003, 14 pages.

Office Action from CN for foreign patent application No. 03821299.4 dated Dec. 24, 2007 (4 pgs) with English translation (4 pgs).

Current claims in CN for foreign patent application No. 03821299.4 (6 pgs).

"Object Serialization and Deserialization Using XML", by Bhatti et al., Advances in Data Management 2000, Tata McGraw-Hill Publishing Co.

"Schema Conversion Methods between XML and Relational Models", by Lee et al., Knowledge Transformation for the Semantic Web, 2003, pp. 1-17, ISBN 1-58603-325-5.

* cited by examiner

EFFICIENT REPLICATION OF XML DATA IN A RELATIONAL DATABASE MANAGEMENT SYSTEM

FIELD OF THE INVENTION

The present invention relates generally to data management and, more specifically, to techniques for effectively and efficiently replicating XML data in a relational database management system (RDBMS).

BACKGROUND

Database replication, or data replication, is a technique for keeping data synchronized across multiple databases. For example, one may want to replicate a database for backup purposes, or maintain different copies of a database at different locations. In either type of scenario, the goal is to have the same data operations performed on all copies of the database. One approach enables flexible data replication by providing a data stream that can be subscribed to by other databases. Changes to data in a source database are logged as events and sent over the stream. This approach tolerates some differences in the databases and, therefore, is effectively a logical copy process rather than a physical copy process. One such approach to data replication among multiple databases is described in U.S. Pat. No. 6,889,231 to Souder et al., entitled "Asynchronous Information Sharing System" ("the Souder patent"), the entire content of which is incorporated by reference in its entirety for all purposes as if fully disclosed herein.

Since an RDBMS may support storage and management of XML data, there is a need to replicate XML data among multiple databases. However, there are many challenges with replicating XML data in a cost-efficient manner. Replicating XML data can be expensive because XML data can be very verbose because, unlike relational data, XML data contains repetitious tags. This is especially problematic for replicating update operations, where only a small portion of the XML document may have changed via a given update operation. Further, an RDBMS may "shred" the XML data into object-relational ("OR") and/or relational data constructs. However, replicating complete XML data would not leverage existing OR replication functionality.

Additionally, the XQuery Data Model can be used to represent the result of an XQuery or XPath expression, represented as an ordered sequence of arbitrary items of corresponding data types. A sequence may contain nodes, atomic values, or any mixture of nodes and atomic values. The XQuery Data Model is described in "XQuery 1.0 and XPath 2.0 Data Model (XDM)" available as a W3C Recommendation from the W3C organization, the entire content of which is incorporated by reference in its entirety for all purposes as if fully disclosed herein. SQL/XML allows XMLType data stored in a database to be either (a) XML (Document), e.g., an XML 1.0 document; or (b) XML (Content), e.g., an XML fragment; or (c) XML (Sequence), e.g., the result of an XQuery data model sequence. Thus, with the introduction of XQuery and the XQuery Data Model and the concept of XML (Sequence) XML data type in the database system, XQuery Data Model sequences should also be supported for replication.

Hence, based on the foregoing, there is a need for techniques for efficiently replicating XML data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1A:
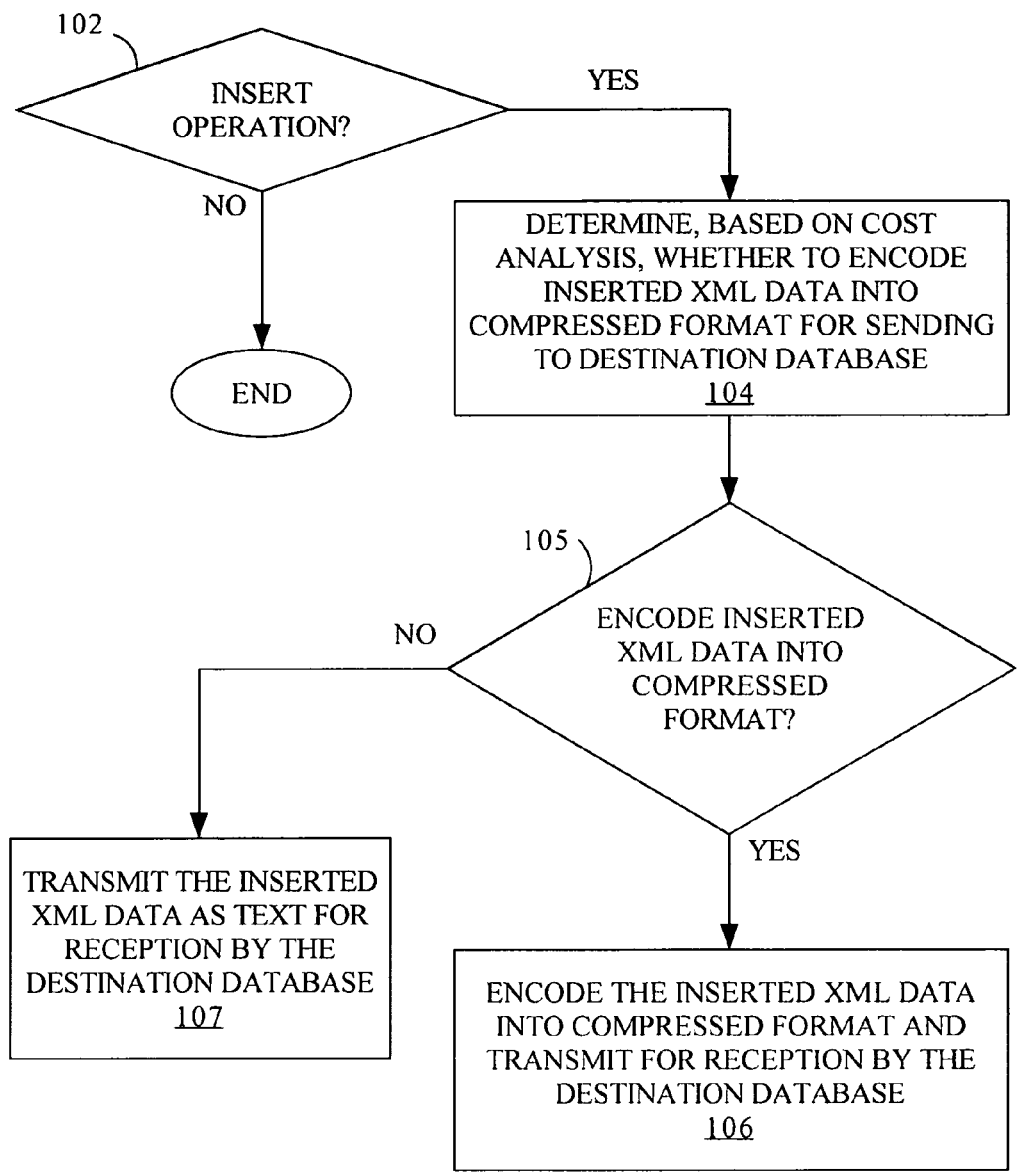
FIG. 1A is a flow diagram that illustrates a process for replicating XML data, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

FUNCTIONAL OVERVIEW OF EMBODIMENTS

Techniques for efficiently replicating XML data among databases include techniques for (a) replicating XML data involved with an insert operation; (b) replicating XML data involved with an update operation; (c) leveraging existing relational replication techniques for XML data stored in shredded form using object-relational constructs; and (d) replicating XQuery Data Model sequences. Each of these techniques is applicable to a particular operation and/or scenario associated with replicating XML data from a source database to one or more destination databases (at times referred to as "target" databases). Each of these techniques reduces the amount of data that would otherwise need to be transferred over a network for XML data replication purposes, where database replication may involve logical copying of data rather than strictly physical copying of data.

If XML data is involved in an insert operation at the source database, then a cost-based analysis can be performed to determine whether or not to convert the XML data to a compressed representation for sending over the network for the destination database. The cost-based analysis is based on the size of the XML data and the data constructs used to store the XML data, in view of the related access or construction mechanisms used to construct an XML document containing the XML data.

If XML data is involved in an update operation at the source database, then only the difference between versions of the XML data before and after the update operation (e.g., an XMLDiff) is sent over the network for the destination database. Furthermore, this difference between versions of the XML data can be generated directly from the DML commands (which embody the update operation) issued on the data, rather than materializing the different versions of the XML data and computing the actual difference between the versions.

If an XML document that is shredded and stored in a relational database needs to be replicated, then the existing relational replication mechanism may be used to replicate XML data. For example, based on existing technology, an XML document may be shredded and XML data from the XML document stored in relational columns, one or more of which may store Large Objects (LOBs). If this object-relational XML data is involved in replication, then rather than sending the LOB along with the rest of the XML document to the destination database, a pointer to the location of the LOB at the destination database is inserted into the XML document in place of the LOB, and this XML document is sent to the destination database. The LOB column data is sent separately. Hence, the values in the column of the relational table are replicated separately using the relational replication infrastructure, and then included in the XML document at the destination database by using the inserted pointer to locate the relationally replicated LOB.

In order to support replication involving instances of the XQuery Data Model, e.g., XML (Sequence), XQuery sequences are represented in a lossless and storage-independent form. An XML document is used to accurately represent an XQuery sequence, where the XML document marks the boundaries between items in the sequence and provides data types for the items. Furthermore, because an XQuery sequence is represented as an XML document, some of the other foregoing techniques may be applied thereto. For example, the compressed format and/or the XMLDiff may be used in association with the XML document representing the XQuery sequence, to achieve further efficiencies with the XML replication process.

Operating Environment-Storage System

A database system typically comprises one or more clients that are communicatively coupled to a database server that is connected to a shared database. "Database server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server. As mentioned, database replication refers to techniques for keeping data synchronized across multiple databases.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One non-limiting database language supported by many database servers is known as the Structured Query Language (SQL).

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using XPath and the XQuery query language) or a relational-centric (e.g., using the SQL/XML query language) manner. Such a repository is at times referred to as an XML repository or an XML database (i.e., "XDB").

Handling Replication of Insert Operations

Because of the large size of XML data, according to one embodiment a compressed format for XML is used for the replication of XML data from a source database to one or more destination databases. Thus, XML data that is inserted into the source database can be encoded into the compressed format and sent over the network in that compressed format to the destination database. One non-limiting example of a compressed format that may be used in the replication of XML data is described in U.S. patent application Ser. No. 11/182, 997 filed by Ravi Murthy et al., entitled "Encoding of Hierarchically Organized Data for Efficient Storage and Processing" ("the Murthy application"), the entire content of which is incorporated by reference in its entirety for all purposes as if fully disclosed herein.

Further, use of a compressed format may be implemented in an optimal manner, using a cost-based analysis, to avoid costly conversions to the compressed format when the benefits of transmitting converted XML data do not outweigh the cost of conversion. For example, if a user is inserting a relatively small XML document and already has the document in text form, replication of the XML document may be more efficient by simply replicating the XML as text. However, if the XML document being inserted is relatively large or requires construction (e.g., from an object type, SQL/XML operators, etc.) from underlying data constructs, then replication of the XML document may be more efficient by using the compressed format. Therefore, according to one embodiment, if XML data is involved with an insert operation at the source database, then a cost-based analysis is performed to determine whether or not to convert the XML data from a character-based form to a compressed representation for sending over the network for the destination database. In a related embodiment, the cost-based analysis considers the size of the XML data and the manner in which the XML data is stored at the source database, e.g., whether or not an XML document containing the XML data needs to be constructed from underlying base data constructs.

The Murthy application describes XML data compression techniques that take advantage of known constraints and structure imparted to an XML document from a corresponding XML schema to which an XML document conforms. Hence, according to one embodiment, the decision as to whether or not to use a compressed format of XML for replication considers the degree of compression attainable by compressing the XML data being replicated, where the degree of compression is based at least in part on a schema to which the XML data conforms.

In some scenarios, the cost-based analysis may determine that it is not efficient to use a compressed format for replicating XML data. According to one embodiment, in a scenario in which it is determined not to use a compressed format for replicating XML data, and in which the XML data requires construction from underlying data constructs, the "construction functions" (e.g., object types, SQL/XML operators, etc.) used to construct the XML data from underlying data constructs are transmitted for the destination database instead of transmitting the constructed XML document. Hence, the XML document is logically copied to the destination database because the document can be constructed at the destination using the construction functions, without materializing and physically representing the XML document at the source and transmitting this physical representation to the destination.

Handling Replication of Update Operations

When XML data is updated in a RDBMS, replicating the entire new version of the XML document of which the XML data is part can be costly when the document is large, and overly costly when only a small change is made to the document. Thus, in order to efficiently replicate changes made to an XML document, according to one embodiment only the difference between the two versions of the document are transmitted from the source for the destination. Because the source and destination databases may not be identical (e.g., XML elements may be in different orders in the different databases), it is the changes to the XML data that need to be captured and replicated. Thus, replicating data updates by only replicating the difference between versions before and after such updates provides flexibility and tolerance for non-identical databases.

The difference between the document before and after the update can be represented using one of various formats available for comparing XML documents and representing the differences between compared documents. One non-limiting technique for computing and representing the differences between two XML documents is described in U.S. patent application Ser. No. 11/401,610 filed by Balasubramantam Sthanikam et al., entitled "EFFICIENT EVALUATION FOR DIFF OF XML DOCUMENTS" ("the Sthanikam application"), the entire content of which is incorporated by reference in its entirety for all purposes as if fully disclosed herein. The techniques described in the Sthanikam application generate an XML document that represents the difference between two XML documents. Any representation of differences between two XML documents or two versions of XML data is generally referred to herein as an "XMLDiff", regardless of what technique is actually used to compute and represent such differences.

According to one embodiment, an XMLDiff can be automatically generated from DML commands issued on XML data. For example, suppose a user submits the following update statement using an UPDATE command:

```
UPDATE purchaseorder
    SET OBJECT_VALUE = updateXML(OBJECT_VALUE,
    '/PurchaseOrder/User/text( )', 'SKING')
        WHERE existsNode(OBJECT_VALUE,
            '/PurchaseOrder[Reference=
            "SBELL-2002100912333601PDT"]')
        = 1.
```

For example, the following XMLDiff would represent the difference between the XML documents identified in the update statement, where the 'update-node' operation replaces the UPDATE DML command:

```
<xd:xdiff xmlns:xd=http://xmlns.oracle.com/xdb/xdiff.xsd
    xmlns:xsi=http://www.w3.org/2001/XMLSchema-instance
    xsi:schemaLocation="http://xmlns.oracle.com/xdb/xdiff.xsd
    http://xmlns.oracle.com/xdb/xdiff.xsd">
        <xd:update-node xpath="/PurchaseOrder/User/text( )"
        node-type="text">
            <xd:content>SKING</xd:content>
        <xd:update-node>
</xd:xdiff>
```

According to one embodiment, an XMLDiff is generated by automatically analyzing the DML operator(s) issued against the source database, without actually materializing and comparing the different versions of the XML data before and after the changes are made to the data. For example, a mapping between XML DML operators and XMLDiff operations, which may be used to generate an XMLDiff from DML operators, is as follows:

| XML DML operator | XMLDiff operation |
|---|---|
| updateXML | update-node |
| insertXMLBefore | insert-node-before |
| appendChildXML | append-node |
| deleteXML | delete-node |
| insertChildXML | combination of insert-node-before and append-node, or update-node on the parent |

Hence, generating an XMLDiff directly from the DML operators reduces the data replication process to a data operation-based replication process rather than a data item-based (e.g., row-based) replication process, where a single operation may affect multiple data items. This is because the update operations are, in effect, transmitted from the source database to the destination database, rather than transmitting the updated data items. Transmitting an operation-based XMLDiff over a network is typically a more efficient, less resource-intensive process than transmitting data items affected by corresponding DML operators.

Furthermore, at times a user will issue an update statement that changes the whole document. In such a scenario, the XMLDiff document is computed by looking at the old and new values. This computation can be a computationally expensive operation. For example, if the document to be sent to the destination database is small, then the XMLDiff computation may not be worth the cost, in comparison with the cost of simply sending the new values. Thus, according to one embodiment, a cost-based analysis is performed to determine whether or not to compute an XMLDiff to represent the difference between two versions of XML data, for sending to one or more destination databases in the context of replicating changes to the XML data.

According to one embodiment, the XMLDiff is compressed even further in scenarios in which the XML data is stored in a shredded form. In such a scenario, an internal identifier is placed in the XMLDiff in place of the XPath expression associated with the updated XML data, thereby reducing the size of the data transmitted for replication purposes. The identifier identifies the relational column(s) in which the shredded XML data is actually stored. The identifier can then be used on the apply (destination) database to look up the internal storage location of the shredded XML data rather than traversing an XPath to locate this data.

Handling XML Replication Utilizing Relational Replication of Shredded XML Data

To effectively scale and perform, XML data replication can leverage an existing relational replication mechanism for shredded XML data (i.e., data from an XML document stored in a relational database as a set of relational entities, relations, and attributes). This is especially important for large values (e.g., large text nodes), such as those stored in Large Object (LOB) datatypes. Such an XML document can be replicated by replicating the values in the relational columns using the relational replication infrastructure, and by putting pointers in the XML document to the relationally replicated LOB at the destination. In one embodiment, the pointer is implemented in the form of an XInclude, which is described in "XML Inclusions (XInclude) Version 1.0" available as a W3C Recommendation from the W3C organization, the entire content of which is incorporated by reference in its entirety for all purposes as if fully disclosed herein.

Thus, the values in the relational columns are replicated separately and then included in the XML document on the apply (destination) database using XInclude, rather than materializing the entire XML document for transmission to the destination database and, therefore, duplicating replication of the object-relational data. When the XML document with the pointer reaches the destination database, the parser recognizes the pointer, recognizes the unique LOB identifier associated with the pointer, and retrieves the relationally replicated LOB that is at the destination. The XInclude is located within the XML document at the location at which the referenced LOB is to be included in the XML document at the destination.

Handling Replication of XQuery Data Model Sequences

To provide a more effective XML replication framework, the framework supports instances of the XQuery Data Model by providing a serialization form for XQuery ordered sequences for transmission from a source database for one or more destination databases. An XQuery serialization approach described in "XSLT 2.0 and XQuery 1.0 Serialization," available as a W3C Recommendation from the W3C organization, is a loose representation of the XQuery sequence because it does not maintain boundaries between text nodes, atomic values, etc., within the sequence. Therefore, the XQuery 1.0 serialization approach is not used to replicate XML (Sequence). Instead, a lossless and storage-independent form of serialization is used to replicate XML (Sequence).

According to one embodiment, the XQuery Data Model is supported for replication purposes by representing XQuery sequences in a form that is both lossless and storage-independent, by representing such sequences in a text-based representation. According to one embodiment, an XML document is used to represent XQuery sequences for replication purposes. The XML document form of an XQuery sequence is lossless because the document marks the boundaries between items of the sequence and provides data types for scalars. The XML document form of an XQuery sequence is storage-independent because it is a text-based rather than a binary representation of the XQuery sequence. Furthermore, because the XQuery sequence is represented as an XML document, other techniques described herein can be implemented in conjunction with this form of XQuery sequence representation (e.g., a compressed format for XML, XMLDiff).

For an example of a representation of an XQuery sequence as an XML document, consider the XQuery sequence (1, @foo=bar, <xml version=1.0><a>1</a>). This sequence can be represented as:

```
<sequence>
    <item type=xsd:int> 1 </item>
    <item type=attribute><name>foo</name><value>bar</value></item>
    <item type=document><a> 1 </a></item>
</sequence>
```

Replicating Inserted XML Data

FIG. 1A is a flow diagram that illustrates a process for replicating XML data, according to an embodiment of the invention. The process illustrated in FIG. 1A is implemented for automated performance by a conventional computing system, such as computer system 300 of FIG. 3.

If XML data was inserted into a source database, at block 102, then at block 104 it is determined whether to encode the XML data into a compressed format for sending for reception by one or more destination databases for replication purposes. One available technique for encoding XML data into a compressed format is the technique described in the Murthy application. For example, a cost-based analysis could be used to make the foregoing determination, based on the cost of encoding the XML data into whatever compressed format is implemented versus the cost of transmitting the unencoded XML data to the one or more destinations. Non-limiting factors that may be considered in a cost-based analysis include (a) the size of the XML data, which affects both the cost of encoding and the cost of transmitting, and (b) the form in which the XML data is stored, such as whether the XML data is stored in shredded form, is stored as a LOB, or needs to be constructed using one or more construction functions (e.g., from an object type, SQL/XML operators, etc.), etc.

At decision block 105, if the determination at block 104 is that a compressed format of XML should be used for replication purposes, then the XML data that was inserted at the source database is encoded into a compressed format of choice, and transmitted for reception by one or more destinations, at block 106. At decision block 105, if the determination at block 104 is that a compressed format of XML should not be used for replication purposes, then the XML data that was inserted at the source database is transmitted as text for reception by one or more destinations, at block 107. As discussed, one technique for sharing information, which may be used at blocks 106 and 107, is described in the Souder patent.

Consequently, a more efficient replication of the insert operation is propagated from the source to the destination.

Replicating Updated XML Data

Figure 1B:
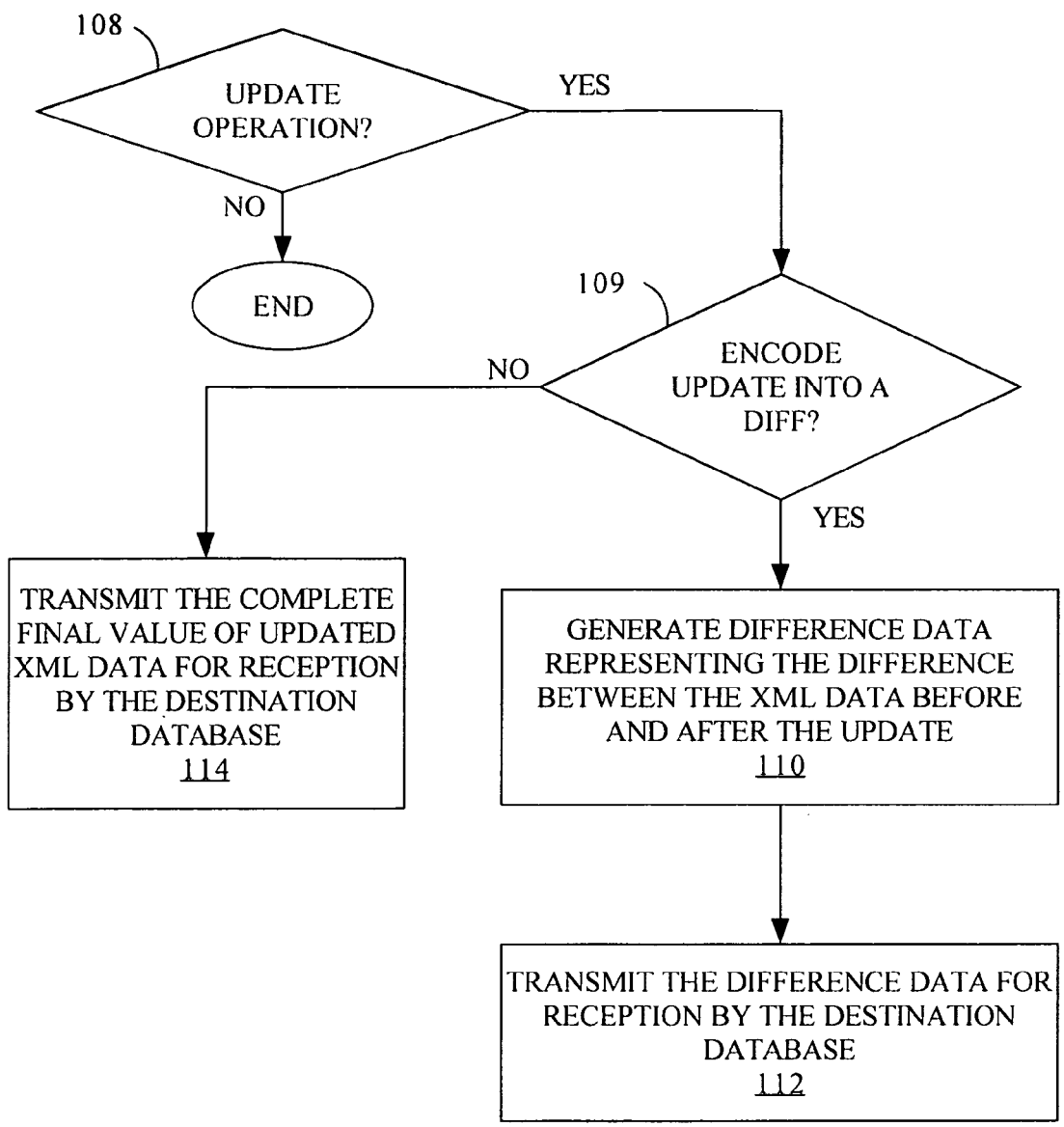
FIG. 1B is a flow diagram that illustrates a process for replicating XML data, according to an embodiment of the invention.

FIG. 1B is a flow diagram that illustrates a process for replicating XML data, according to an embodiment of the invention. The process illustrated in FIG. 1B is implemented for automated performance by a conventional computing system, such as computer system 300 of FIG. 3.

If XML data was the subject of an update operation at the source database, at block 108, then at block 109 it is determined whether to encode the update operation into a "diff" format which represents the difference between the XML data before and after the update operation, for sending for reception by one or more destination databases for replication purposes. For example, a cost-based analysis could be used to make the foregoing determination, based on the cost of encoding the XML data into whatever "diff" format is implemented versus the cost of transmitting the entire updated XML data to the one or more destinations.

If the determination at block 109 is to encode the update operation into a "diff", then at block 110 an XML document is generated which represents the difference in the XML data before and after the update. For example, a form of an XMLDiff is generated to represent the change to the XML data resulting from the update operation. As described herein, the XML document generated at block 110 may be automatically generated based on the DML commands that embody the update operation. Furthermore, whether or not to generate such a representation of the changes may be determined based on a cost analysis comparing, generally, the cost of generating an XMLDiff representation versus the cost of sending the entire XML document of which the XML data is part.

At block 112, the XML document that represents the difference is transmitted for reception by one or more destination databases. As discussed, one technique for sharing information, which may be used at block 112, is described in the Souder patent. Significantly, the XML document that represents the difference is transmitted rather than transmitting the entire document of which the XML data is part. Consequently, a more efficient replication of the update operation is propagated from the source to the destination. Additionally, the XPath that identifies the XML path to the XML data that is subject to the update operation can be substituted, in the information transmitted for reception by the destination(s), with a column identifier that identifies a relational table column in which the XML data is stored at the destination(s).

If it is determined not to generate the representation of the difference in the XML data before and after the update, and if the XML data is stored such that it needs to be constructed (e.g., via an object type, SQL/XML operators, etc.), then the relevant object type, construction operation, etc. may be transmitted for reception by the one or more destinations so that the updated XML data can be constructed at the destination(s). Significantly, the update XML data itself is not transmitted, rather the mechanism to construct the updated XML data is transmitted.

If the determination at block 109 is not to encode the update operation into a "diff", then at block 114 the complete final value of the updated XML data is transmitted from the source database for reception by one or more destination databases.

Blocks 102-106 and blocks 108-112 are not necessarily mutually exclusive for a given replication process. Stated otherwise, a given replication process may include replication of XML data that was inserted into the source database and, thus, needs to be replicated to one or more destination databases, and replication of XML data that was updated at the source database and which needs to be replicated to the destination(s). Thus, flow control may pass from block 106, after an insert operation is handled, to an update operation at block 108, or vice versa. Further, any number of insert and/or update operations may be handled in a given replication process.

Replicating XML Documents with Relationally Replicated Lobs

Figure 2A:
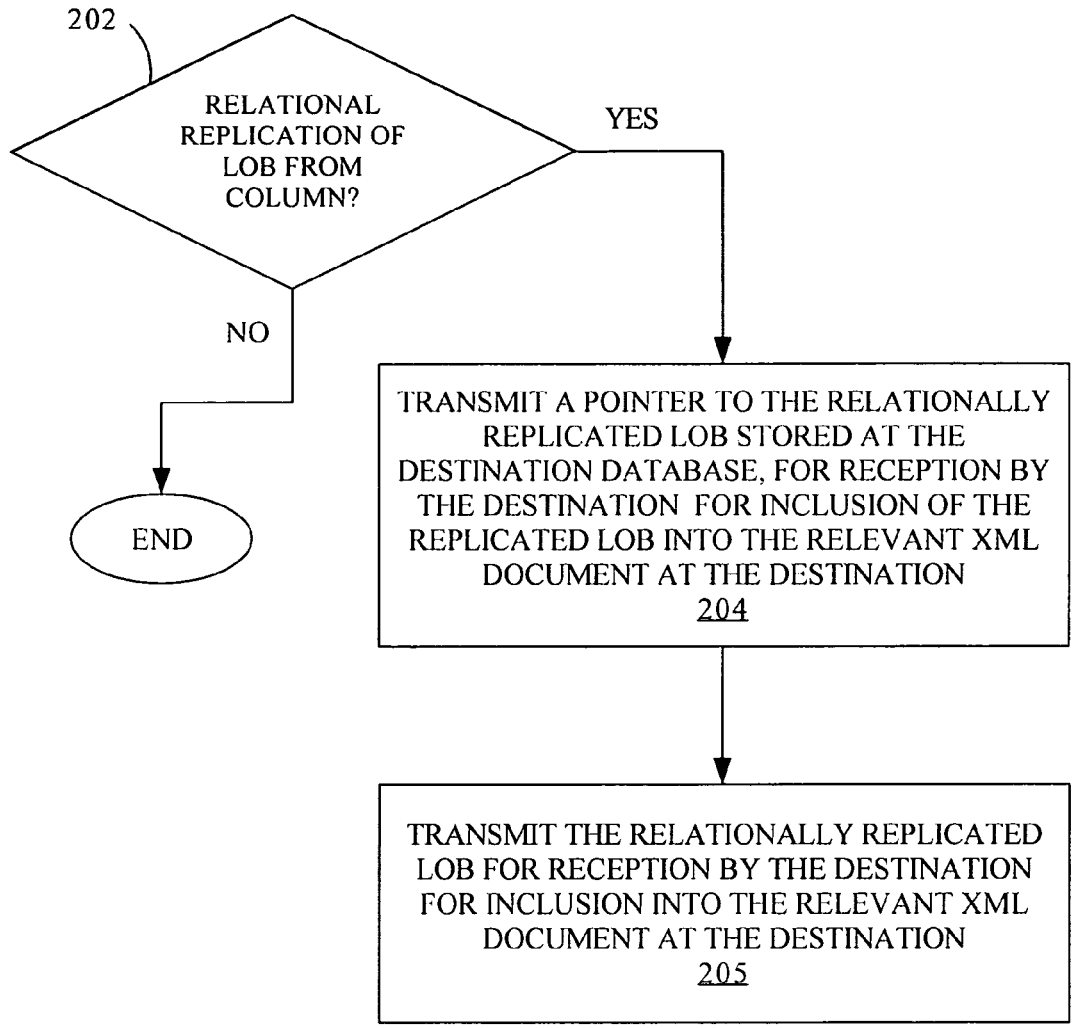
FIG. 2A is a flow diagram that illustrates a process for replicating XML data, according to an embodiment of the invention.

FIG. 2A is a flow diagram that illustrates a process for replicating XML data, according to an embodiment of the invention. The process illustrated in FIG. 2A is implemented for automated performance by a conventional computing system, such as computer system 300 of FIG. 3.

If XML data that is shredded and stored relationally, with part of it represented in a large object (LOB) in the source and destination databases, was replicated using relational data replication techniques (at block 202), then at block 204 an XML document containing a pointer to the relationally replicated LOB at the destination is transmitted for reception by the destination, for replication purposes. For example, the pointer is included in an XInclude command inserted into an XML document of which the XML data is part, at the location within the XML document at which the XML data belongs. This XML document with the XInclude is then transmitted for reception by one or more destination databases. At block 205, the LOB data itself is transmitted for reception by the destination, separately from the pointer. Hence, the destination database can retrieve and include the relationally replicated LOB into the XML document. As discussed, one technique for sharing information, which may be used at block 204, is described in the Souder patent.

Replicating XQuery Data Model Sequences

Figure 2B:
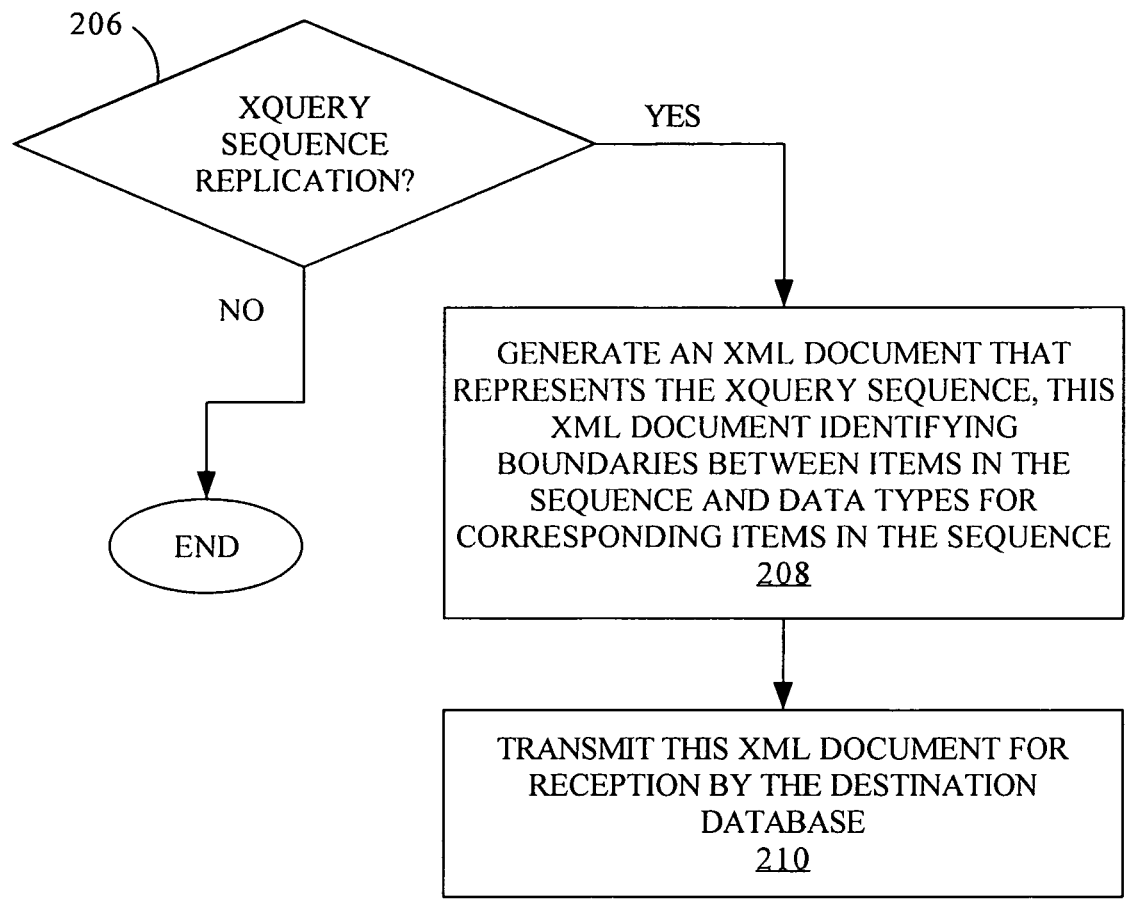
FIG. 2B is a flow diagram that illustrates a process for replicating XML data, according to an embodiment of the invention.

FIG. 2B is a flow diagram that illustrates a process for replicating XML data, according to an embodiment of the invention. The process illustrated in FIG. 2B is implemented for automated performance by a conventional computing system, such as computer system 300 of FIG. 3.

If an XQuery Data Model sequence is the subject of replication from the source database to one or more destination databases, at block 206, then at block 208 an XML document is generated for sequence replication purposes. The generated XML document represents the XQuery sequence in a lossless and storage-independent form, in that the document is a textual rather than a binary representation of the sequence, which identifies the boundaries between the items in the sequence and identifies data types for corresponding items in the sequence. At block 210, the XML document generated to represent an XQuery Data Model sequence is transmitted for reception at one or more destination databases. Consequently, a more efficient replication of the XQuery sequence is propagated from the source to the destination. As discussed, one technique for sharing information, which may be used at block 210, is described in the Souder patent.

Blocks 202-204 and blocks 206-210 are not necessarily mutually exclusive for a given replication process. Stated otherwise, a given replication process may include replication of an XML document that includes XML data that was stored as a LOB and replicated from the source to the destination using existing relational infrastructure, and replication of an XQuery Data Model sequence generated at the source database and which needs to be replicated to the destination(s). Thus, flow control may pass from block 204, after a XML document with a relationally replicated LOB is handled, to handling an XQuery sequence replication at block 206 or vice versa. Further, any number of such scenarios may be handled in a given replication process. Additionally, replication of the data manipulation operations described in reference to FIGS. 1A and 1B are not mutually exclusive in regards to the replication scenarios described in reference to FIGS. 2A and 2B, because a replication process may include any arbitrary combination of operations and scenarios such as those described in reference to FIGS. 1A, 1B, 2A and 2B.

Hardware Overview

Figure 3:
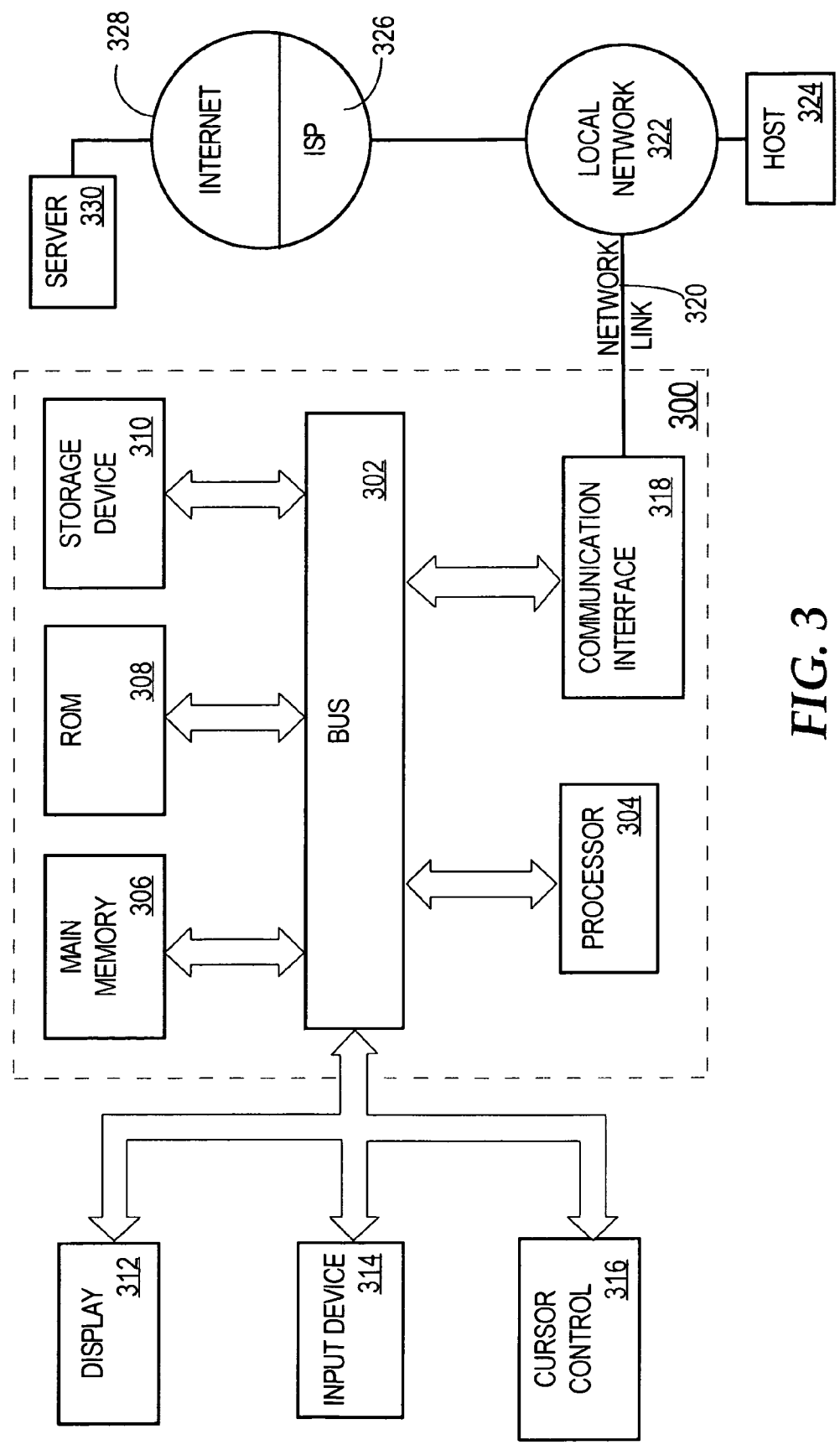
FIG. 3 is a block diagram that illustrates a computer system 300 upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   for XML data that is subject to an update operation in a source database, one or more computing devices automatically generating, from one or more DML (data manipulation language) commands involved with said update operation, XML difference operations to be applied to XML data in a destination database, wherein XML data in said destination database has elements in a different order than in said source database; and
   transmitting said XML difference operations for reception by said destination database for updating said XML data at said destination database.

2. The method of claim 1, further comprising:
   determining whether to generate said XML difference operations based on a cost of generating said XML difference operations.

3. The method of claim 1, further comprising:
   including in said XML difference operations a column identifier that identifies a column in which said XML data is stored at said destination database; and
   wherein transmitting said XML difference operations for reception by said destination database includes transmitting said XML difference operations with said column identifier to said destination database.

4. A method comprising the steps of:
   if first XML data is inserted into a source database, then one or more computing devices determining whether to encode said first XML data into a compressed format prior to transmitting said XML data for reception by said destination database;
   wherein said determining is based on an analysis that is based on the size of said first XML data and the form in which said first XML data is stored in said source database; and
   if determined to encode said first XML data into a compressed format, then encoding said first XML data into said compressed format and transmitting said encoded first XML data for reception by said destination database;
   if said first XML data is subject to an update operation in said source database, then generating XML difference operations to be applied to XML data in a destination database, wherein XML data in said destination database has elements in a different order than in said source database;
   transmitting said XML difference operations for reception by said destination database for updating said first XML data at said destination database;
   if part of said first XML data is replicated from said source database to said destination database using relational data replication, and wherein said part of said first XML data is stored as a large object (LOB) in a column of a relational table in said source and destination databases, then transmitting from said source database for reception by said destination database a pointer to said relationally replicated large object (LOB) in said destination database, for inclusion, at said destination database, of said relationally replicated large object (LOB) into a first XML document of which said first XML data is part;
   if an XQuery Data Model sequence is subject to replication from said source database to said destination database, then generating a second XML document that represents said sequence, wherein said second XML document identifies boundaries between items in said sequence and identifies data types for corresponding items in said sequence.

5. The method of claim 4, wherein if part of said first XML data is
   replicated from said source database to said destination database using relational data replication, and wherein said part of said first XML data is stored as a large object (LOB) in a column of a relational table in said source and destination databases, then transmitting said relationally replicated large object (LOB) from said source database for reception by said destination database for inclusion, at said destination database, of said relationally replicated large object (LOB) into said first XML document;
   wherein said relationally replicated large object (LOB) is transmitted from said source database separately from said pointer.

6. The method of claim 4, wherein generating said XML difference operations includes automatically generating said XML difference operations based on one or more DML (data manipulation language) commands involved with said update operation.

7. The method of claim 4, further comprising:
   including in said XML difference operations a column identifier that identifies a column in which said first XML data is stored at said destination database; and
   wherein transmitting said XML difference operations for reception by said destination database includes transmitting said XML difference operations with said column identifier for reception by said destination database.

8. The method of claim 4, wherein
   if determined not to encode said first XML data into said compressed format based at least in part on a need for said first XML data to be constructed using one or more construction functions, then transmitting said one or more construction functions for reception by said destination database for construction of said first XML data at said destination database.

9. A method comprising the steps of:
   one or more computing devices determining whether to encode XML data inserted into a source database into a compressed format prior to transmitting said XML data for reception by said destination database over a network;
   wherein said determining is based on an analysis that is based on:
   a) the size of said XML data being inserted; and b) whether the XML data needs to be constructed from underlying base data constructs in said source database;
   if determined to encode said XML data into a compressed format, then encoding said XML data into said compressed format and transmitting said encoded XML data for reception by said destination database.

10. The method of claim 9, wherein said determining whether to encode said XML data comprises determining a degree of compression that would result from encoding said XML data into said compressed format, and wherein determining said degree of compression is based on a schema to which said XML data conforms.

11. The method of claim 9, further comprising
if determined not to encode said XML data into said compressed format based at least in part on a need for said XML data to be constructed from underlying base data constructs in said source database, determining not to construct said XML data from said source database and not to transmit said XML data; and
transmitting said one or more construction functions for reception by said destination database for construction of said XML data at said destination database.

12. A method for replicating XML data from a source database to a destination database comprising:
one or more computing devices replicating from said source database to said destination database, using relational data replication, first XML data from an XML document, wherein said first XML data is stored as a large object (LOB) in a column of a relational table in said source and destination databases; and
transmitting from said source database for reception by said destination database a pointer to said relationally replicated large object (LOB);
wherein said relationally replicated large object (LOB) is stored in said destination database, and included into said XML document at said destination database.

13. The method of claim 12, further comprising:
transmitting said relationally replicated large object (LOB) from said source database for reception by said destination database, for inclusion of said relationally replicated large object (LOB) into said XML document at said destination database;
wherein said relationally replicated large object (LOB) is transmitted from said source database separately from said pointer.

14. The method of claim 12, further comprising:
transmitting from said source database for reception by said destination database second XML data from said XML document, wherein said second XML data comprises XML data, from said XML document, other than said first XML data; and
wherein said second XML data includes said pointer to said relationally replicated large object (LOB) at a location within said second data that indicates where within said XML document said first XML data is to be included.

15. A computer-readable volatile or non-volatile medium storing one or more sequences of instructions which, when executed by one or more processors, causes the one or more processors to perform:
for XML data that is subject to an update operation in a source database, one or more computing devices automatically generating, from one or more DML (data manipulation language) commands involved with said update operation, XML difference operations to be applied to XML data in a destination database, wherein XML data in said destination database has elements in a different order than in said source database; and
transmitting said XML difference operations for reception by said destination database for updating said XML data at said destination database.

16. The computer-readable volatile or non-volatile medium of claim 15, further comprising instructions for:
determining whether to generate said XML difference operations based on a cost of generating said XML difference operations.

17. The computer-readable volatile or non-volatile medium of claim 15, further comprising instructions for:
including in said XML difference operations a column identifier that identifies a column in which said XML data is stored at said destination database; and
wherein transmitting said XML difference operations for reception by said destination database includes transmitting said XML difference operations with said column identifier to said destination database.

18. A computer-readable volatile or non-volatile medium storing one or more sequences of instructions which, when executed by one or more processors, causes the one or more processors to perform:
if first XML data is inserted into a source database, then one or more computing devices determining whether to encode said first XML data into a compressed format prior to transmitting said XML data for reception by said destination database;
wherein said determining is based on an analysis that is based on the size of said first XML data and the form in which said first XML data is stored in said source database; and
if determined to encode said first XML data into a compressed format, then encoding said first XML data into said compressed format and transmitting said encoded first XML data for reception by said destination database;
if said first XML data is subject to an update operation in said source database, then generating XML difference operations to be applied to XML data in a destination database, wherein XML data in said destination database has elements in a different order than in said source database;
transmitting said XML difference operations for reception by said destination database for updating said first XML data at said destination database;
if part of said first XML data is replicated from said source database to said
destination database using relational data replication, and wherein said part of said first XML data is stored as a large object (LOB) in a column of a relational table in said source and destination databases, then transmitting from said source database for reception by said destination database a pointer to said relationally replicated large object (LOB) in said destination database, for inclusion, at said destination database, of said relationally replicated large object (LOB) into a first XML document of which said first XML data is part;
if an XQuery Data Model sequence is subject to replication from said source database to said destination database, then generating a second XML document that represents said sequence, wherein said second XML document identifies boundaries between items in said sequence and identifies data types for corresponding items in said sequence.

19. The computer-readable volatile or non-volatile medium of claim 18,
wherein if part of said first XML data is replicated from said source database to said destination database using relational data replication, and wherein said part of said first XML data is stored as a large object (LOB) in a column of a relational table in said source and destination databases, then transmitting said relationally replicated large object (LOB) from said source database for reception by said destination database for inclusion, at said destination database, of said relationally replicated large object (LOB) into said first XML document;
wherein said relationally replicated large object (LOB) is transmitted from said source database separately from said pointer.

20. The computer-readable volatile or non-volatile medium of claim 18,
wherein generating said XML difference operations includes automatically generating said XML difference operations based on one or more DML (data manipulation language) commands involved with said update operation.

21. The computer-readable volatile or non-volatile medium of claim 18, further comprising instructions for:
including in said XML difference operations a column identifier that identifies a column in which said first XML data is stored at said destination database; and
wherein transmitting said XML difference operations for reception by said destination database includes transmitting said XML difference operations with said column identifier for reception by said destination database.

22. The computer-readable volatile or non-volatile medium of claim 18,
wherein if determined not to encode said first XML data into said compressed format based at least in part on a need for said first XML data to be constructed using one or more construction functions, then transmitting said one or more construction functions for reception by destination database for construction of said first XML data at said destination database.

23. A computer-readable volatile or non-volatile medium storing one or more sequences of instructions which, when executed by one or more processors, causes the one or more processors to perform:
one or more computing devices determining whether to encode XML data inserted into a source database into a compressed format prior to transmitting said XML data for reception by said destination database over a network;
wherein said determining is based on an analysis that is based on:
a) the size of said XML data being inserted; and b) whether the XML data needs to be constructed from underlying base data constructs in said source database;
if determined to encode said XML data into a compressed format, then encoding said XML data into said compressed format and transmitting said encoded XML data for reception by said destination database.

24. The computer-readable volatile or non-volatile medium of claim 23,
wherein said determining whether to encode said XML data comprises determining a degree of compression that would result from encoding said XML data into said compressed format, and wherein determining said degree of compression is based on a schema to which said XML data conforms.

25. The computer-readable volatile or non-volatile medium of claim 23, further comprising instructions for:
if determined not to encode said XML data into said compressed format based at least in part on a need for said XML data to be constructed from underlying base data constructs in said source database, determining not to construct said XML data from said source database and not to transmit said XML data; and
transmitting said one or more construction functions for reception by said destination database for construction of said XML data at said destination database.

26. A computer-readable volatile or non-volatile medium storing one or more sequences of instructions which, when executed by one or more processors, causes the one or more processors to perform:
one or more computing devices replicating from said source database to said destination database, using relational data replication, first XML data from an XML document, wherein said first XML data is stored as a large object (LOB) in a column of a relational table in said source and destination databases; and
transmitting from said source database for reception by said destination database a pointer to said relationally replicated large object (LOB);
wherein said relationally replicated large object (LOB) is stored in said destination database, and included into said XML document at said destination database.

27. The computer-readable volatile or non-volatile medium of claim 26, further comprising instructions for:
transmitting said relationally replicated large object (LOB) from said source database for reception by said destination database, for inclusion of said relationally replicated large object (LOB) into said XML document at said destination database;
wherein said relationally replicated large object (LOB) is transmitted from said source database separately from said pointer.

28. The computer-readable volatile or non-volatile medium of claim 26, further comprising instructions for:
transmitting from said source database for reception by said destination database second XML data from said XML document, wherein said second XML data comprises XML data, from said XML document, other than said first XML data; and
wherein said second XML data includes said pointer to said relationally replicated large object (LOB) at a location within said second data that indicates where within said XML document said first XML data is to be included.

* * * * *

UNITED STATES PATENT AND TRADEMARK OFFICE
CERTIFICATE OF CORRECTION

| | | |
|---|---|---|
| PATENT NO. | : 7,853,573 B2 | Page 1 of 1 |
| APPLICATION NO. | : 11/416835 | |
| DATED | : December 14, 2010 | |
| INVENTOR(S) | : James W. Warner et al. | |

It is certified that error appears in the above-identified patent and that said Letters Patent is hereby corrected as shown below:

In column 9, line 56, delete "update" and insert -- updated --, therefor.

Signed and Sealed this
Ninth Day of August, 2011

David J. Kappos
*Director of the United States Patent and Trademark Office*